United States Patent [19]

Martins

[11] Patent Number: 4,589,797
[45] Date of Patent: May 20, 1986

[54] FIXING MEMBER ADAPTED TO BE CLAMPED ON A SHAFTLIKE ELEMENT

[76] Inventor: Boerge Martins, Vom Bergeweg 1A, D-2000 Hamburg, Fed. Rep. of Germany

[21] Appl. No.: 364,849
[22] PCT Filed: Nov. 12, 1980
[86] PCT No.: PCT/DK80/00069
  § 371 Date: Mar. 24, 1982
  § 102(e) Date: Mar. 24, 1982
[87] PCT Pub. No.: WO82/00325
  PCT Pub. Date: Feb. 4, 1982

[30] Foreign Application Priority Data

Jul. 24, 1980 [DK] Denmark .............................. 3185/80

[51] Int. Cl.$^4$ ........................... F16B 2/00; F16B 7/04
[52] U.S. Cl. .................................. 403/372; 403/374; 403/409.1; 411/161; 411/943; 474/903
[58] Field of Search ............... 403/372, 368, 345, 365, 403/367, 369, 370, 371, 374, 405.1, 406.1, 407.1, 408.1, 409.1, 410.1; 474/902, 903; 74/446; 29/446, 526 R, 159; 411/943, 545, 161, 162, 164

[56] References Cited

U.S. PATENT DOCUMENTS

| | | | |
|---|---|---|---|
| 891,574 | 6/1908 | Swain | 411/161 X |
| 1,477,785 | 12/1923 | Szukalski, Jr. | 403/365 X |
| 2,191,101 | 2/1940 | Stellin | 411/161 |
| 2,290,056 | 7/1942 | Koubek | 411/943 X |
| 2,339,549 | 1/1944 | Kubaugh | 411/943 X |
| 2,573,226 | 10/1951 | Shafer | 411/161 X |
| 2,798,748 | 7/1957 | Maurer | 403/372 |
| 2,852,949 | 9/1958 | Arthur | 403/371 X |
| 2,989,327 | 6/1961 | Hermanus | 403/372 |
| 3,077,218 | 2/1963 | Ziegler | 411/161 X |
| 3,112,116 | 11/1963 | Seitz | 403/370 X |
| 3,168,338 | 2/1965 | Spieth | 403/365 |
| 3,372,366 | 3/1968 | Cochrum | 411/161 X |
| 3,578,364 | 3/1971 | Hermann et al. | 403/370 |
| 3,614,140 | 10/1971 | Nestor | 403/369 |
| 3,730,571 | 3/1973 | Van Buren, Jr. | 403/365 X |
| 3,779,659 | 12/1973 | Habert | 403/372 |
| 3,995,967 | 12/1976 | Haller | 403/372 X |

FOREIGN PATENT DOCUMENTS

| | | | |
|---|---|---|---|
| 0107992 | 7/1943 | Fed. Rep. of Germany | 411/545 |
| 1005324 | 3/1957 | Fed. Rep. of Germany | |
| 1008537 | 5/1957 | Fed. Rep. of Germany | |
| 1111885 | 7/1961 | Fed. Rep. of Germany | |
| 2156898 | 5/1972 | Fed. Rep. of Germany | |
| 935042 | 1/1948 | France | 411/545 |
| 427591 | 11/1947 | Italy | 403/370 |
| 664218 | 1/1952 | United Kingdom | |
| 1284494 | 8/1972 | United Kingdom | 403/410 |

*Primary Examiner*—Cornelius J. Husar
*Assistant Examiner*—Todd G. Williams
*Attorney, Agent, or Firm*—Marmorek, Guttman & Rubenstein

[57] ABSTRACT

A fixing member in the form of a clamping disc having a radial opening, and being adapted to be clamped onto a shaft with the aid of a counter member having a coaxial opening is disclosed. Fastening means connect the disc and the counter member to one another so as to embrace the shaft when the shaft is passed through the openings. The clamping disc has a truncated and normally generally conical portion converging in a direction towards the opening, an outer rim, and an inner accordian-like annular portion integral with the outer portion. The inner portion has an inner rim and radially outwardly extending folds defining substantially flat portions between adjoining folds. The inner rim has a wave-shaped contour as viewed radially outwards. The disc is adapted to support the counter member near the outer rim thereof in an axial direction. When the counter member and the disc are tightened to one another by the fastening means, the disc is at least partially flattened and distorted so as to frictionally engage the shaft.

11 Claims, 21 Drawing Figures

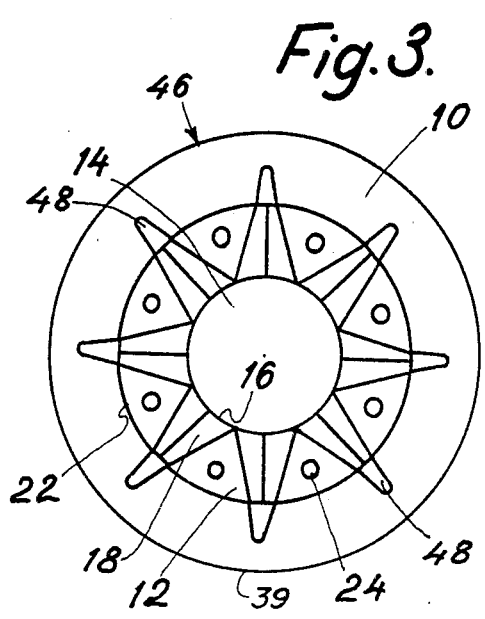
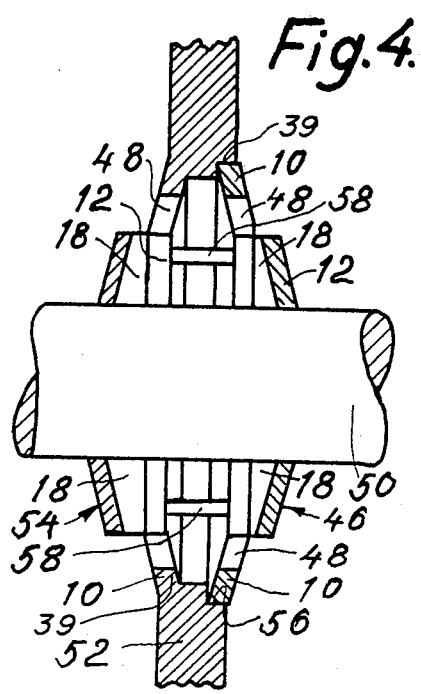
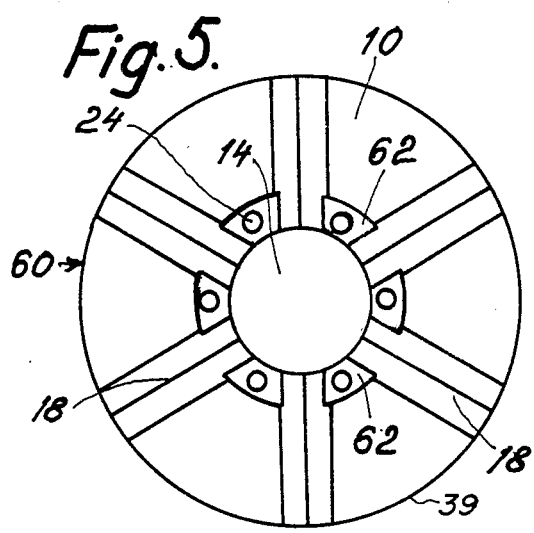
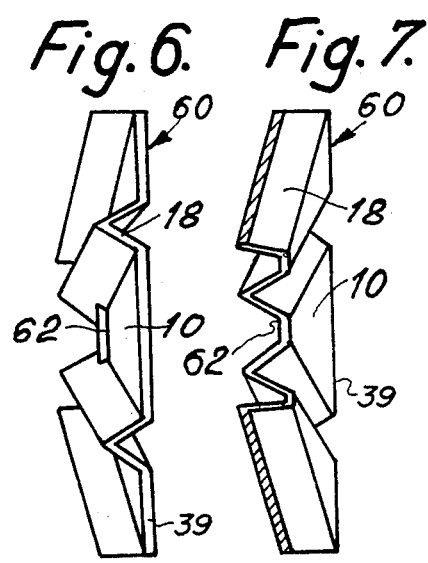

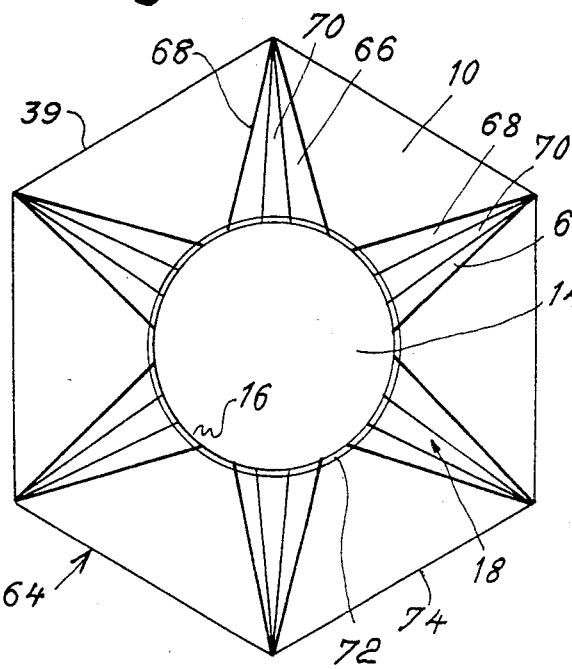
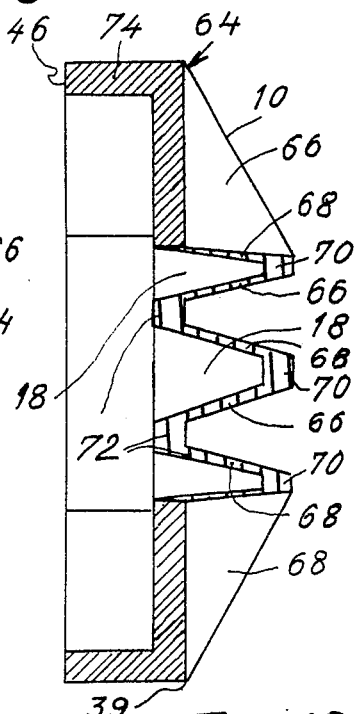
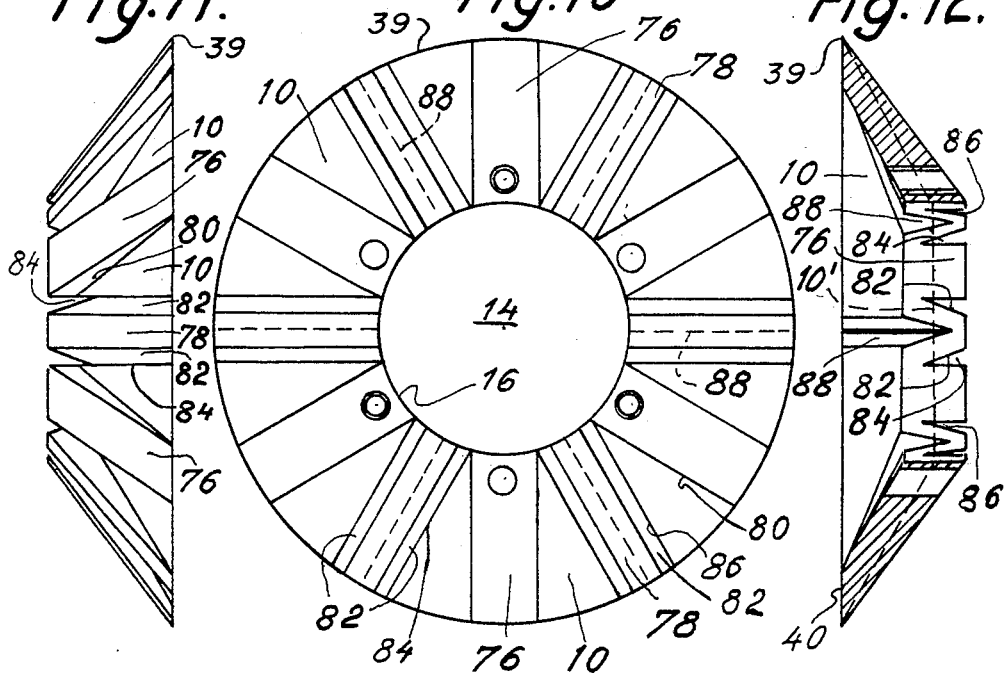

FIXING MEMBER ADAPTED TO BE CLAMPED ON A SHAFTLIKE ELEMENT

TECHNICAL FIELD

This invention relates to a clamping disc or fixing member which can be securely clamped onto a shaft.

BACKGROUND ART

Such fixing members are known, for example from British patent specification No. 670,392 dealing with V-belt pulleys made from plate material and provided with a middle part formed as a fixing member of the type concerned. From the above patent specification also a similar fixing member is known adapted as such to cooperate with a V-belt pulley part shaped like such a fixing member.

Such fixing members have the great advantage that they can be stamped from sheet metal in a simple manner and, therefore are cheap to manufacture. Furthermore, such a fixing member, may easily be clamped onto a shaft. By means of bolts, which pass through holes in the fixing member and then are screwed into a counter member that, for example, may be a correponding fixing member provided with threaded holes, or which pass through holes in the counter member, extend into a fixing member arranged on the other side of the counter member. Further it has been shown that and provided a very fine tolerance between the center opening of the fixing member and the shaft exists the center opening may be narrowed to such a degree that the fixing member with its inner edge face grips the shaft tightly. The narrowing of the central opening arises upon flattening of the fixing member by tightening of the bolts. This arrangement may be procured easily and readily and results under such circumstances in such a firm clamping, that quite large torques can be transmitted through the connection provided between the fixing member and the shaft. Thus, it is even possible to use pulleys arranged with such fixing members as driver pulleys for large eccentric presses which, during each stroke, produce high torques and, therefore, require a very effective clamping effect.

For such a connection between a fixing member and a shaftlike element to transmit sufficiently large torques it is necessary, however, for the fixing member to fit into the shaft with such fine toletolerances that such shafts and fixing members cannot be obtained in practice by methods of mass production. Consequently, in practice, it has been shown that generally the known fixing members, whether used merely as fixing members or as parts of larger elements, can be used only in such cases where, compared to the diameter of the shaft, only relatively small torques have to be transmitted. Therefore, today such fixing members are only of little use, if of any use at all.

OBJECT OF THE INVENTION

The object of this invetnion is to provide a fixing member of the type discussed above, that is able to transfer to or from this element much larger torques than is possible by known fixing members after having been clamped onto a shaft or a shaftlike element without any particularly fine tolerances being necessary. It is also an object of this invention to be able to produce such fixing members by methods of mass production, such as, by stamping from metal It is also an object of this invention to find new fields of application for such a fixing member.

DISCLOSURE OF THE INVENTION

According to the invention these objects are achieved by the present invention which provides for a fixing member having a radial opening and being adapted to be clamped onto a shaft-like element passing through the opening by deforming the fixing member upon application of axial pressure. The fixing member comprises an outer truncated and normally generally conical portion converging in a direction towards the radial opening, the outer portion having an outer rim in contact with and adapted to be axially supported by an abutment member. The fixing member also includes an inner accordion-like portion integral with the outer portion, the inner portion terminating in an inner rim at the radial opening. the inner portion also includes radially outward extending folds with substantially flat portions between the folds. The inner rim has a wave-shape contour and is adapted to receive the shaft-like element. Upon application of axial pressure, the fixing member flattens and deforms, causing the inner rim to frictionally engage the shaft-like element with great force.

Due to the greater flexibility of the inner portions of the fixing member, of the present invention which flexibility arises from the inventive folds, the flattening of the fixing member's main portion is obtained by compressing it in a direction perpendicular to the plane of the abutting surface. This results substantially in a contraction of the center or axial opening and, thereby in a pressure exerted between the disc's inner edge face and the shaft or shaftlike element which is substantially greater than that obtained from the above-described known fixing members. Additionally, the surface contact between the inner edge of the fixing member and the shaftlike element is substantial increased, often more than doubled, owing to the zigzag or wave-shape of the inner edge, and, therefore, a further substantial increase of the forces of friction between the fixing member and the shaftlike element is obtained. This advantage can be further enhanced inasmuch as the fixing member of the present invention also make it possible to use thicker material than heretofore. Finally, the side edges of the inner edge face of the fixing member are inclined relative to the direction in which an applied torque attempts to rotate the fixing member on the shaft. Together all these advances permit much coarser tolerances to be used than has been possible by the previously known fixing members. For example, even when allowing a tolerance of about 0.1 mm, a fixing member, according to the invention, will be able to transfer between itself and the shaftlike element torques considerably greater than those attainable by the abovedescribed known fixing members. At the same time, such fixing members can be produced without much greater manufacturing costs. Furthermore, an new fields of application may be found for the present fixing member. Thus, whereas the known fixing members were useful only in connection with circular cylindric shafts, a fixing member according to the present invention may be adapted to shafts of any cross-sectional shape, for example oval and polygonal shafts, on which very often it is desired to obtain a firm attachment of an element.

The fixing member may further be suitably formed so that each fold is V-shaped in cross-section and has two sides which converge radially outwardly. as, since it has been shown that especially high radially inwardly directed clamping forces may be obtained thereby.

In case, as is already partially known from the prior art, the fixing member is formed to have folds extending over the middle portion only while the main portion has elongated apertures opposite the folds., it has been shown that it is possible to ensure a considerable radial contraction of the center opening even when the fixing member is made from thick sheet material. It is thus possible to obtain great contact pressure between the fixing member and the shaftlike element. In this case, it is most advantageous if elongated apertures converge outwardly while, the weakening of the main portion due to the openings is kept as small as possible.

In case the fixing member is form to have folds which are substantially V-shaped in cross-section and have sides extending parallel to each other, a flattening of the main portion not only result in a contraction of the center opening, but simultaneously in a tendency towards radial expansion of the fixing member's outer edge, which in this case may also be zigzag or wave shaped. Therefore, in case the fixing member is located within a correspondingly dimensioned recess, for example, in a rim of a driving member to be attached to a shaft, the fixing member is able not only to be secured with great force to the shaft, but also can be clamped with great force to the circumferential wall of the recess. Consequently, the fixing member, preferably together with another corresponding fixing member arranged at the opposite side of the driving member, is able to ensure a firm attachment of the driving member to the shaft without additional clamping means, such as bolts.

A special and large field of application of the fixing member according to the present invention, may be obtained, if the inner rim is threaded since in this case the fixing member may serve as a self-locking nut. If such a fixing member or nut is screwed onto a thread until contact with another element is obtained, and if, after a certain contact pressure has been reached, the nut is further rotated, the innermost part of the main portion of the fixing member will be pressed inward towards the other element. and owing to the contraction of the center opening caused thereby, the thread of the center opening will be forced onto the thread axially as well as radially, The deformations thereby produced will ensure a reliable retaining of the fixing member or nut, even in the case where there are considerable vibrations. Although not absolutely necessary, advantageously in this case, the fixing member may further be shaped so that its outer rim is in the shape of a polygon.

Further the fixing member may be shaped to have projections on its inner and outer rims so that it is possible, by lining up two or more fixing members, to obtain a very large clamping surface between the joint fixing members and the shaftlike element, without it being necessary to manufacture the fixing members from too thick a sheet of material and without it being necessary to use too great a force for compressing the fixing member assembly.

Additionally, the fixing member may be formed so that the thickness of the main portion decreases in a radially outward direction, whereby it is possible to further increase the tendency of the center opening to contract and, thereby, to increase the clamping forces.

Finally, the fixing member may be provided with notches on its outer rim so that a perceptible expansion of the outer edge of the fixing member can be. This enables the fixing member to be securely located within a recess of another element.

BRIEF DESCRIPTION OF THE DRAWINGS

FIG. 3 is an elevational view of another embodiment of a fixing member of this invention;

FIG. 4 is an axial sectional view of the member shown in FIG. 3 which engages with a driving member having a middle portion that itself constitutes a fixing member similar to the one shown in FIG. 3;

FIGS. 5, 6 and 7 are a front elevational view, a side elevational view, and a cross sectional view, respectively of a third embodiment of a fixing member of this invention;

FIGS. 8 and 9 are a front elevational view and a sectional view, respectively, of an embodiment of a fixing member of this invention, formed as a selflocking nut;

FIGS. 10, 11 and 12 are a front elevational view, a side elevational view, and a sectional view, respectively, of another embodiment of the fixing member of this invention;

DESCRIPTION OF THE PREFERRED EMBODIMENTS

Figure 1:
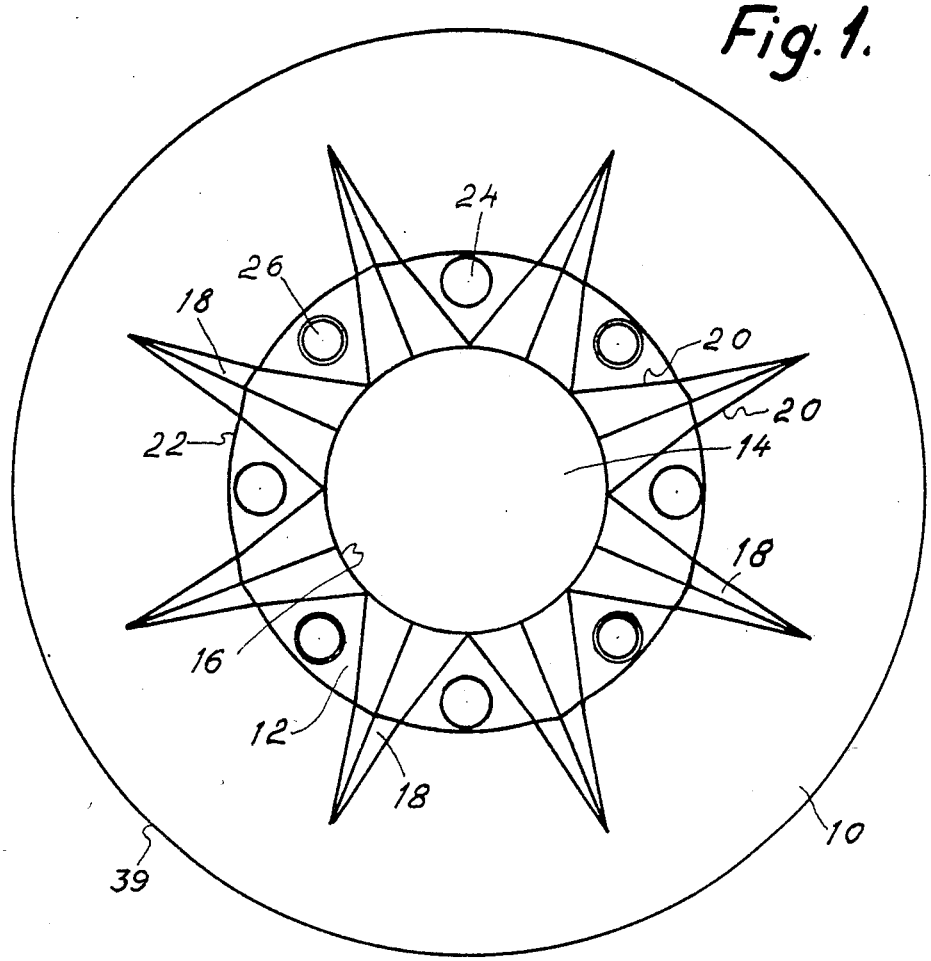
FIG. 1 is a side elevational view of one embodiment of the fixing member of this invention.
Figure 2:
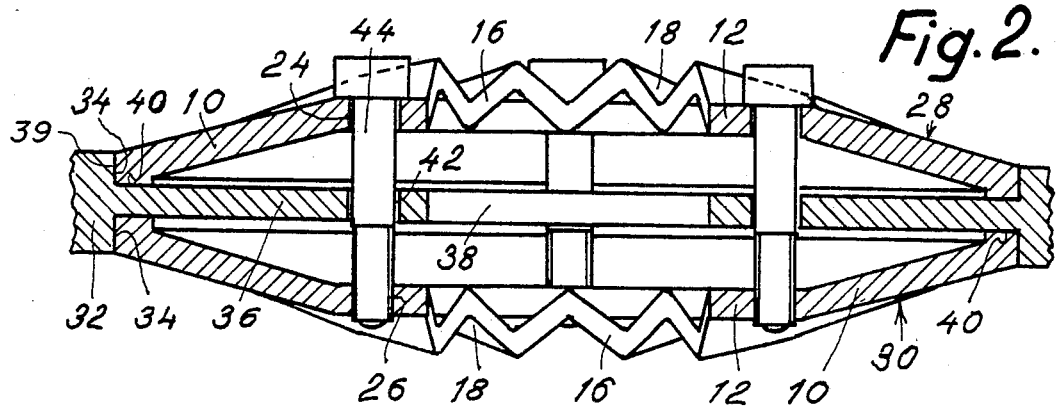
FIG. 2 is a sectional view of two fixing members similar to the one shown in FIG. 1, and arranged on either side of an element adapted to be attached to a shaft.

The fixing member shown in FIG. 1 is usually stamped from sheet metal, but it may also be made by molding, or by being pressed from a suitably formed blank. The fixing member is in the form of a clamping disc. It comprises a main portion 10 normally shaped as a relatively flat truncated cone and which has an outer rim 39 and an approximately planar middle portion 12 provided with a center opening 14 having a diameter which corresponds to the diameter of a shaft which can be slid into the opening 14, and on which the fixing member 10 is to be clamped. The middle portion 12 is provided with a plurality, for example eight, angularly equispaced folds 18 radiating from the inner edge rim 16 of the fixing member and radially extending over the middle portion 12, this constituting therewith an inner, accordion-like annular portion having inner rim 16. In the embodiment shown, each fold 18 is formed as shown in FIG. 2, and has a cross-section with a plurality of substantially V-shaped portions decreasing in depth in a radially outward direction and also, in the same radially outward direction, has converging side edges 20. The inner edge face 16 of the middle portion 12 extends, owing to the folds 18, approximately in zigzag fashion, as shown in FIG. 2, and is formed over its whole axial length as a part of the same cylindrical surface.

In the embodiment shown, each of two adjacent folds 18 meet at the center opening 14, but the number of the folds and/or their width at the center opening 14 may vary. It is at least necessary that two adjacent folds be interconnected by an edge face portion forming a part of a ring-shaped or cylindrical surface. The folds 18 may even have a more rounded crosssection resulting in an approximately wave-shaped edge face.

The middle portion 12 is provided between each of two adjacent folds 18, and near a radial transition region 22 to the main portion 10, with a bolt hole 24 or 26, of which every second hole 24 is a plain hole, whereas the remaining holes 26 are threaded.

At its rear or lower side, the main portion 10 is provided along its outer circumference with a radially extending abutting surface 40, best seen in FIG. 2.

In FIG. 2 it is shown how two fixing members 28 and 30, both similar to the one shown in FIG. 1, but rotated 45° relative to each other, can be used for securing a pulley 32, of which only the innermost part is shown, to a shaft (not shown). In this case, the pulley 32 serves as a counter member for fixing member 28. The inner part of the pulley 32 is, at each side, provided with recesses 34 leaving between them a disc-shaped middle part 36 provided with a center opening 38 into which the shaft can preferably be slidably fitted, although the center opening 38 may be larger than the diameter of the shaft. The two fixing members 28 and 30 are placed in the two recesses 34 with their abutting surfaces 40 contacting the middle part 36. Owing to the aforementioned mutual angular displacement of the two fixing members 28 and 30, each unthreaded hole 24 of the uppermost fixing member 28 in FIG. 2 is aligned with a threaded hole 26 in fixing member 30. The pulley middle part 36 is fixing member 30 also provided with unthreaded holes 42 aligned with the holes 26. An Allen screw or a bolt may be inserted in each one of the plain holes 24 of the fixing member 28, and extending through the corresponding holes 42 in the pulley part 36, can be screwed into the corresponding threaded holes 26 in the lowermost fixing member 30 shown in FIG. 2.

Provided the bolts 44 are only screwed sufficiently into the threaded holes 26 that the members 28, 30 and 32 are kept together, the pulley 32, together with the fixing members 28 and 30 may be fitted onto a corresponding shaft so that the fixing members 28 and 30 embrace the shaft. When the pulley 32 takes up its proper position on the shaft, the bolts 44 are tightened, so that the middle portions 12 of the two fixing members 28 and 30 are urged towards each other, pressure being exerted near the transition region 22 of each main portion 10. Thus the main portion 10 of each fixing member 28 and 30 is urged to be flattened and thereby to cause a distortion or radial contraction of the transition region 22, and also of the middle portion 12, so that the diameter of the center opening 14 is in some degree diminished. This causes the fixing members 28 and 30 to frictionally engage the shaft and thereby to be secured thereto. The aforesaid contraction of the middle portion 12 is facilitated owing to the folds 18, which are also in some degree compressed in their transverse direction. Therefore, as a result of the tightening of the bolts 44 there is obtained not only a substantial desired contraction of the center opening 14 but also, exertion of a very high pressure of the edge faces 16 against the shaft. Further since the area of contact between the inner edge face 16 of the fixing members and the shaft is large, owing to the zigzag shape of the edge face 16, even a slight tightening of the bolts 44 has the result that the rather high torques can be transmitted to the shaft by the pully The higher the torques, the stronger the bolts 44 must be tightened. Still further the fact that the inner edge face 16 includes edges extending obliquely to radial planes through the shaft, contributes to preventing a sliding movement between the shaft and the inner edge face 16, and thereby to an increase of the torque that can be transmitted.

In FIG. 3 a fixing member 46 is shown differing from the one shown in FIG. 1 in that the folds 18 extend over the middle portion 12 only, whereas the main portion 10 opposite to each fold 18 is provided with an opening in the form of an elongated aperture 48. These openings 48 make the flattening of the main portion 10 still easier than the wedge-shaped extensions of the folds 18 over a part of the main portion 10 shown in FIG. 1. The embodiment shown in FIG. 3 is of importance mainly in connection with fixing members for small shaft diameters.

In FIG. 4 there is shown how a fixing member 46 somewhat similar to the one shown in FIG. 3 may be utilized for securing an element 52 to a shaft 50. Fixing member 46 has a middle part 54 which is integral with fixing member 46 and yet acts as a counter member for fixing member 46 so that element 52 can be secured to shaft 50. Fixing member 46 engages a recess 56 formed in the element 52 opposite to the middle part 54. Middle part 54 and the main portion of fixing member 46 are urged towards each other by means of bolts 58 extending through unthreaded holes 24 in fxing member 46 between its folds 18, which bolts 58 are screwed into corresponding threaded holes in middle part 54. Although the fixing member 46 shown is provided with eight holes designated 24, only four threaded holes in middle part 54 are necessary.

FIGS. 5 to 7 show a fixing member 60 comprising a main portion 10 extending between the outer circumference or rim 39 and the center opening 14 of the member. The folds 18 extend over the whole width of the main portion 10 and have over their whole length the same cross-sectional shape. The main portion 10 is provided near the center opening 14 and between the folds 18 with thickened portions 62 providing forwardly extending contact faces for engagement with the heads or sides of nuts, bolts, or screws to be inserted into the unthreaded or threaded holes and serving as clamping means. This embodiment has the advantage that when flattened, the main portion 10 will not only cause a contraction of its center opening 14, but also an expansion of its circumference, in the same degree such a fixing member, or preferably two or more fixing members of this type joined to one another are especially suited for fastening onto a shaft an element with a hub, the hub having a through-going center bore of a diameter larger than the shaft diameter. At each end of the hub bore two cooperating fixing members 60 may be arranged. Thus, a fastening of this kind of element to a shaft may be obtained that is just as effective as that obtainable by compressible conical spacer bushings generally used for this purpose. It has to be observed that washers provided with conical oblique undersides may be substituted for the thickened portions 62.

FIGS. 8 and 9 show a fixing member of this invention formed as a self-locking nut 64. Also in this case the conical main portion 10 extends from the center opening 14 to the circumference or outer rim 39 of the member. This circumference is polygonal, namely hexagonal, as is the case in most nuts, but it may also be circular, for example if the nut is to be threaded on an element manually.

Contrary to the embodiments described above in which the folds 18 are pressed forwards from the main portion 10 and have a V-shaped cross-section, which are more or less rounded at the bottom, the nut 64 shown in FIGS. 8 and 9 is provided with folds 18 pressed outwardly from the main portion 10. These folds have slanting side walls 66 and 68 which are mutually interconnected by an outer wall 70, so that the cross-sections are approximately U-shaped portions, although having slanting sides and a relatively sharp transition between the latter and the bottom of the U-shaped portions. The side walls of each of the folds 18 converge radially outwardly and decrease in width, so that all three walls 66, 68 and 70 converge into an apex at a corner of the polygon. Further, at the center opening 14, neighboring folds 18 are separated by a predetermined distance. This shape results in obtaining at the center opening 14 a relatively large face area which is well suited for being provided with a thread 72.

The nut 64 has on its rear side, as shown to the left in FIG. 9, an axially extending outer wall 74 following the outer periphery of the nut, and thus also being hexagonal at the outside, though its interior may have a circular or cylindrical face. The free end face of the wall 74 constitutes the radial abutting surface 46 of the nut or fixing member 64.

Such a nut 64 can, for example, by means of a wrench, be screwed onto a threaded member, for example a threaded shaft or bolt end, and will work as a normal nut until the abutting surface 46 contacts a face on the element to which it is fastened. When the nut is turned further thereafter, owing to its internal thread of the element and its mesh with the thread, the inner edge 16 of the main portion 10 will axially be urged towards the contact face of the element, so that the main portion 10 will be somewhat flattened and consequently, the diameter of its center opening will be reduced. Since the main portion 10 opposes the flattening, an especially large axial pressure will be exerted between the internal threads 72 of the nut and the threads of the member onto which the nut is threaded and simultaneously the threads 72 will be pressed radially inwardly with a great pressure. Thus a great radial pressure will be exerted between the threads of the two members, resulting in unusually elastic deformation of the threads locking the same together. Such a nut which, by mass production, may be formed in the same way as normal nuts, has shown itself to be cheaper in manufacture, and more effective than hitherto known self-locking nuts.

In the embodiment shown in FIGS. 10 to 12, the main portion 10 also extends from the center opening 14 to the outer periphery 39 of the member, but this embodiment may also be adapted to fixing members having a flat middle portion. The front side, shown in FIG. 10, of the main portion 10 is provided with an even number of ribs 76 and 78, of which every second rib 76 has approximately a rectangular cross-section and is wedge-shaped in a radial direction so that it has its greatest height near the center opening 14. Thus, the side walls 80 of the ribs 76 are approximately perpendicular to the main portion 10, although they may also form an acute angle therewith. The other ribs 78 have approximately trapezoidol formed cross-sections, being widest at the bottom, and are also approximately wedge-shaped along the radial direction. Their slanting side walls 82 extend downwardly below the upper side of the main portion 10, the theoretical course 10' of which is shown by dotted lines in FIG. 12, so that on both sides of each rib 78 there is provided an approximately V-shaped groove 84, the wall 86 of which opposite to the wall 82 is perpendicular to the upperside of the main portion 10 and the bottom of which is situated lower than the upper side 10'. Each rib 78 is at its lower side provided with a V-shaped groove 88, the bottom of which is situated higher than the uppersde 10' of the main portion 10. Thus, each rib 78 forms a fold of the type characteristic of this invention and, that as a result of an axial compression of the fixing member, the inner edge 16 of the main portion 10 is forcibly pressed inwardly. Especially due to the ribs, the embodiment shown in FIGS. 10 to 12 results in particularly large contact or friction areas being obtained between the fixing member and the shaft or the like receiving the fixing member.

Figure 13:
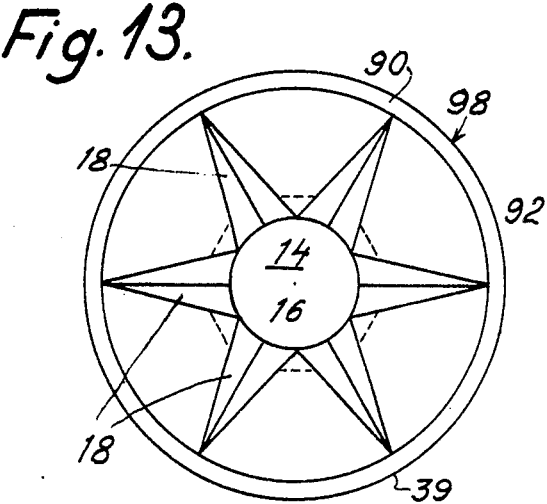
FIGS. 13 and 14 are a front elevational view and a sectional view, respectively, of an embodiment of two fixing members cooperating as a unit, according to this invention.
Figure 14:
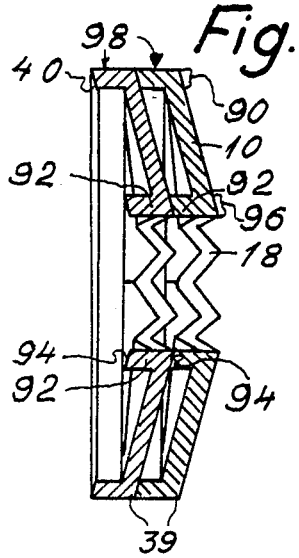

In each of the two fixing members 98 shown in FIGS. 13 and 14, the abutting surfaces 40 follows an outermost zone 90 of the main portion 10. Thus each abutting surface 40 forms a part of a truncted cone corresponding to the uppersde of the main portion 10 as viewed in FIG. 13. The abutting surface 40, as well as the outer zone 90 may also be may be situated in radial planes. Further, each fixing member 98 near the edge 16 of the center opening 14 and between, for example, three pairs of neighboring folds 18 at its rear side, is provided with projections 92 of such a length, that their free end faces 94 contact the innermost part of the main portion 10 of a similar fixing member arranged behind it i.e., on the left as viewed in FIG. 14, coaxial therewith, and with mutually parallel folds 18. Consequently, the two fixing members 98 will form a unit, and when the rear member of the two fixing members 98, i.e., the fixing member on the left in FIG. 14, has its abutting surface 40 contacting an abutment face of the shaft-like element receiving the fixing members, an axial pressure exerted on the frontmost fixing member 98 near its center opening 14 will result in a uniform compression and flattening of both fixing members 98. The two fixing members will therefore act together as a single fixing member having a contact or friction face cooperating with a matching shaftlike element having twice the area of the individual fixing members, whereas the two fixing members 98 will require a substantially smaller axial pressure for developing a certain flattening compared to a single fixing member of double thickness.

It has to be noted that, naturally, also the faces 94 and 96 can be situated in radial planes, and further the embodiment shown may be adapted to such fixing members which besides the main portion 10 also include a flatter middle portion.

Figure 15:
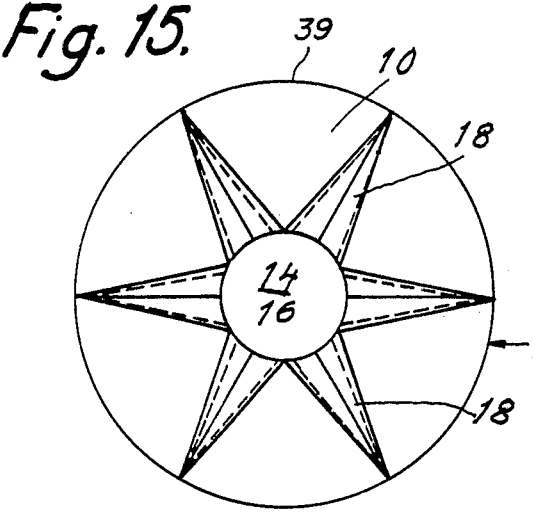
FIGS. 15 and 16 are corresponding views of another embodiment of two fixing members cooperating as a unit, according to this invention.
Figure 16:
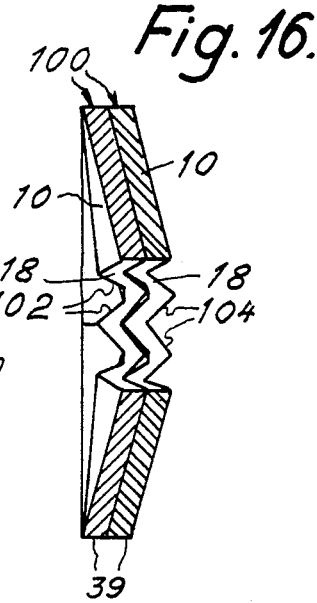

In FIGS. 15 and 16 there is shown another unit comprising two fixing members 100 which, when arranged one behind the other in the quantity wanted, can ensure that an especially large area of friction is provided between the fixing members and a shaftlike element, the compression pressure required compared to the total area of friction obtained being relatively small.

Each fixing member 100 comprises only a main portion 10 with folds 18, but a corresponding unit with which it is arranged may comprise a fixing member which, besides the main portion 10, has a flatter, preferably planar middle portion corresponding to the middle portion 12 shown in FIGS. 1 and 2. In the embodiment shown in FIGS. 15 and 16, the folds 18 are so shaped that the angle between the faces 102 is slightly smaller than the angle between the faces 104 so that the folds 18 do not prevent a close contact between the main portions 10 and cannot prevent the pressing together of the folds by flattening of the fixing members 100.

Figure 17:
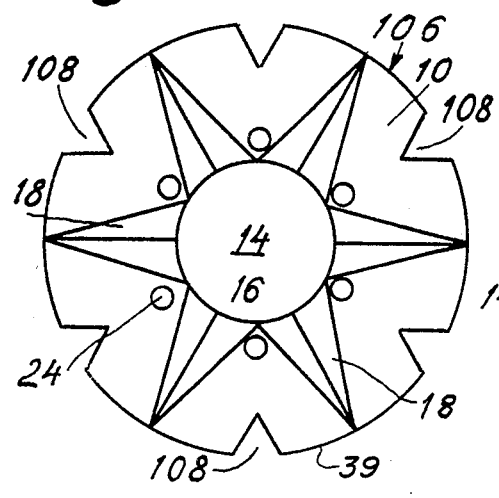
FIGS. 17 and 18 are front elevational views of two further embodiments of the fixing member, according to this invention.

FIG. 17 shows a fixing member 106 in which, at its outer edge, the main portion 10 is provided with notches 108 ensuring that an axial compression of the member besides a contraction of its center opening 14 provides substantially an expansion of its outer edge. Preferably two pairs of such fixing members 106, each pair facing in opposite directions, are well suited for obtaining a firm connection between a shaft and a pipe-like member surrounding the shaft, when the fixing members pairs are inserted in the space between the two elements. This, for example, makes it possible to secure simple belt pulleys which per se only have to consist of the pulley rim.

Figure 18:
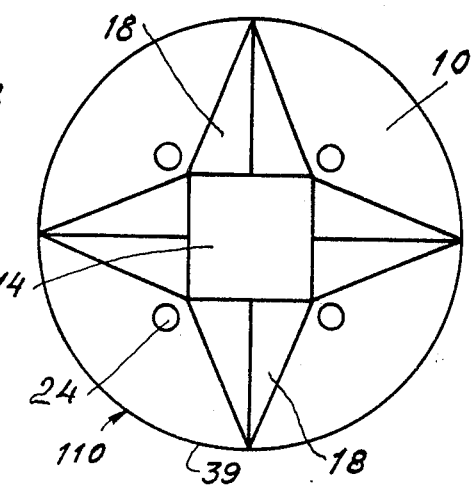

FIG. 18 shows how a fixing member 110 of this invention may also be formed to serve for fastening an element to a shaft or journal that has a polygonal cross-section such as the square cross-section of the embodiment shown.

Figure 19:
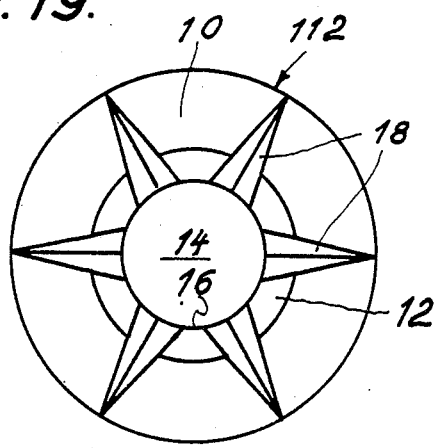
FIGS. 19 and 20 are a front elevational view and a sectional view, respectively, of a fixing member of this invention adapted to serve as a washer.
Figure 21:
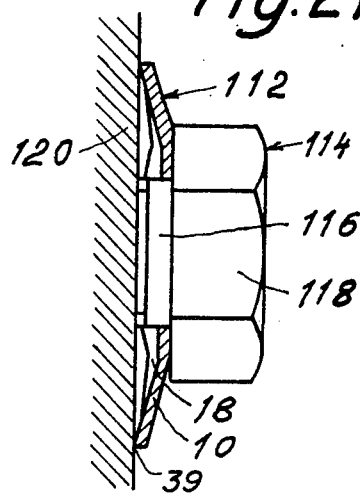
FIG. 21 is a sectional view of the fixing member shown in FIGS. 19 and 20, arranged on a bolt.
Figure 20:
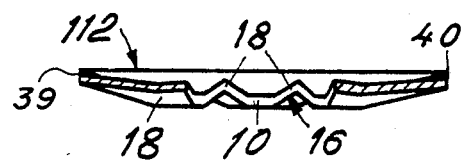

Finally, FIGS. 19 to 21 show a fixing member 112 of this invention adapted to be used as a washer for a bolt head or a nut. This fixing member comprises a main portion 10, a middle portion 12 and rearwardly or outwardly, i.e., to the right in FIG. 21, stamped folds 18. The edge 16 of the center opening 14 has a diameter that corresponds to the diameter of a corresponding bolt generally designated 114 as shown in FIG. 21 which may be slid into the opening 14. The abutting surface 40 is relatively sharp, but may also be somewhat chamfered. The fixing member in the form of a washer 112 is placed around the bolt shank 116, and by tightening the bolt by means of its nut-shaped head 118, the washer will be compressed between the inner side of the bolt head and the outer side of the element 120 to be fastened to another element, by means of the bolt 114. The fixing member 112 is compressed so that its inner diameter is diminished and the washer clamped to the bolt shank 116 simultaneously with its being pressed strongly against the outer side of the element 120, thereby in a usual manner counteracting rotation of the washer. Thus, a washer of this type provides a substantially better security against loosening of the bolt than hitherto known lock washers, even spring washers.

The fixing member 112 can also be inserted around the threaded part of a bolt between a nut and an element, and will thereby be clamped to the bolt and will not be rotatable relative thereto.

As appears from what is stated above, a fixing member of this invention can have many varied embodiments, partly depending on its field of application, and can be implemented in manners different from those given as examples in the drawings and explained above. Further, the specification describes only a few of the many fields of application of a fixing member according to the present invention.

It should to be noted that even though in most cases bolts are used as clamping means for compression of the fixing member, many other clamping means may be used in practice. Thus, in connection with the fixing member in the form of nut 64 shown in FIGS. 8 and 9, the clamping means are constituted by the threads of the bolt on which the nut is threaded, and in connection with the washer 112 shown in FIGS. 19 to 21, they are constituted by a bolt head or a nut. Also for compression of fixing members of this invention serving to clamp driving elements to a shaft, nuts may be used as the clamping means, for example flanged nuts, or other elements able to exert a pressure on the middle portion 12 of the fixing member, or on the inner border of the main portion 10, which clamping means may otherwise be independent of the fixing member itself.

I claim:

1. A fixing member having an axial opening and being adapted to be clamped onto a shaft-like element passing through said opening by deforming said fixing member upon application of axially acting clamping means, comprising an outer truncated and normally generally conical portion converging in a direction towards said opening, said outer truncated portion including an outer rim having a surface adapted to contact and axially to be supported by a counter member, an inner accordion-like portion integral with said outer portion, said inner portion terminating in an inner rim at said axial opening, said inner portion including radially outward extending folds, and substantially flat portions between said folds, at least some of said flat portions being adapted to be influenced by said clamping means for being axially urged in the direction of said counter member, said inner rim having a wave-shaped countour as viewed radially outwardly and being adapted to receive said shaft-like element, whereby upon appliction of axial pressure to said fixing member by means of said clamping means, said fixing means is in some degree flattened and said folds in some degree compressed and thereby said fixing member deformed so that said inner rim frictionally engages said shaft-like element.

2. A fixing member as claimed in claim 1, wherein said fixing member has a front part corresponding to the upper side of said outer truncated portion and a rear part corresponding to the lower side of said outer truncated portion, and wherein said front part is adapted to engage with the rear part of a second fixing member near said outer and inner rims.

3. A fixing member as claimed in claim 1 wherein said fixing member is integral with said counter member at said outer rim.

4. A fixing member as claimed in claim 1, wherein each of said folds has a substantially V-shaped cross-section, and two major sides converging in a radially outward direction.

5. A fixing member as claimed in claim 1, wherein said outer truncated conical portion converges at a predetermined angle, and wherein said flat portions converge in a direction towards said axial opening at an angle greater than said predetermined angle, a radial transition zone being defined between said flat portions and said outer conical portion, said folds terminating at said transition zone, said outer conical portion having an elongated aperture near the termination of each fold extending radially outwards.

6. A fixing member as claimed in claim 5, wherein each elongated aperture converges in a direction towards said outer rim.

7. A fixing member as claimed in claim 1, wherein each fold has a substantially V-shaped cross-section and two major sides extending substantially parallel to one another.

8. A fixing member as claimed in claim 1, wherein said axial opening is circular, and wherein said inner rim is threaded.

9. A fixing member as claimed in claim 1, wherein said outer rim has a contour in the shape of a polygon.

10. A fixing member as claimed in claim 1, wherein said outer truncated conical portion has a thickness decreasing in a radially outward direction.

11. A fixing member as claimed in claim 1, wherein said outer rim has free end portions, and wherein at least some of said end portions have notches.

* * * * *